United States Patent [19]

Yamagishi

[11] Patent Number: 5,379,433
[45] Date of Patent: Jan. 3, 1995

[54] PROTECTION AGAINST UNAUTHORIZED USE OF SOFTWARE RECORDED ON RECORDING MEDIUM

[75] Inventor: Toru Yamagishi, Tokyo, Japan

[73] Assignee: Victor Company of Japan, Ltd., Yokohama, Japan

[21] Appl. No.: 32,561

[22] Filed: Mar. 16, 1993

Related U.S. Application Data

[63] Continuation of Ser. No. 520,016, May 7, 1990, abandoned.

[30] Foreign Application Priority Data

May 8, 1989 [JP] Japan .................. 1-114755

[51] Int. Cl.$^6$ .................. G06F 12/14; H04L 9/00
[52] U.S. Cl. .................. 395/725; 380/4; 380/25; 360/60; 340/825.3; 364/DIG. 1; 364/286.4; 364/286.5; 364/286.6
[58] Field of Search .................. 364/DIG. 1, DIG. 2; 380/4, 25; 340/825.3, 825.34; 360/60; 395/725, 425

[56] References Cited

U.S. PATENT DOCUMENTS

| | | | |
|---|---|---|---|
| 4,446,519 | 5/1984 | Thomas | 395/425 |
| 4,458,315 | 7/1984 | Uchenick | 364/DIG. 1 X |
| 4,462,078 | 7/1984 | Ross | 380/4 |
| 4,562,306 | 12/1985 | Chou et al. | 380/4 |
| 4,577,289 | 3/1986 | Comerford et al. | 360/60 |
| 4,584,641 | 4/1986 | Guglielmino | 380/4 |
| 4,593,353 | 6/1986 | Pickholtz | 380/4 |
| 4,644,493 | 2/1987 | Chandra et al. | 380/4 |
| 4,688,169 | 8/1987 | Joshi | 395/725 |
| 4,734,796 | 3/1988 | Grynberg et al. | 360/60 |
| 4,740,890 | 4/1988 | William | 380/4 |
| 4,748,561 | 5/1988 | Brown | 395/425 |
| 4,785,361 | 11/1988 | Brotby | 360/60 |
| 4,796,220 | 1/1989 | Wolfe | 380/4 |
| 4,858,036 | 8/1989 | Ginkel | 360/60 |
| 4,864,494 | 9/1989 | Kobus, Jr. | 395/575 |
| 4,866,769 | 9/1989 | Karp | 380/4 |
| 4,903,296 | 2/1990 | Chandra et al. | 380/4 |
| 4,910,625 | 3/1990 | Albrecht et al. | 360/135 |
| 4,959,861 | 9/1990 | Howlette | 380/4 |
| 4,975,898 | 12/1990 | Yoshida | 369/100 |
| 4,980,782 | 12/1990 | Ginkel | 360/60 |
| 5,027,396 | 6/1991 | Platteter et al. | 380/4 |
| 5,033,084 | 7/1991 | Beecher | 380/4 |
| 5,034,980 | 7/1991 | Kubota | 380/4 |
| 5,056,009 | 10/1991 | Mizuta | 395/425 |
| 5,131,091 | 7/1992 | Mizuta | 395/725 |

OTHER PUBLICATIONS

Installation Instructions, Xilinx P-SILOS Simulator, p. 3.
Partial ROM Disk Feasibility Studies for CCS and DBF 90mm Disk Format, Hitachi, Ltd. (Aug 3, 1989).
"130 mm Rewritable Optical Disk Cartridges," Information Technology, SC23 Optical Digital Data Disks, 2nd DP 10089, (Sep. 1989).

*Primary Examiner*—Paul V. Kulik
*Attorney, Agent, or Firm*—Lowe, Price, Leblanc & Becker

[57] ABSTRACT

A system for protecting an unauthorized use of a recorded content. The system uses a recording medium including a first recording area in which data including a program are recorded and further including a second recording area which is formed at a specific position thereof and in which data including a specific identification code are recorded so as not to be rewritable by a user. The recording medium is coupled through a recording/reproduction device to a control unit for executing the program recorded in the first recording area of the recording medium. The control unit reads out the identification code recorded in the second recording area and stops the execution of the program when the read-out identification code is not coincident with a predetermined ID code.

17 Claims, 2 Drawing Sheets

PROTECTION AGAINST UNAUTHORIZED USE OF SOFTWARE RECORDED ON RECORDING MEDIUM

This application is a continuation of application Ser. No. 07/520,016 filed May 7, 1990now abandoned.

BACKGROUND OF THE INVENTION

The present invention relates to a system of giving protection against impermissible use of a software such as a program recorded on a recording medium.

Generally known is a recording medium having ROM (an area which is not allowed to be rewritten by the user) areas and RAM (an area which is allowed to change its data by the user) areas, software being prestored in each ROM area in production of the recording medium. Recently, attempts for configuring the recording medium are being made for software protection purposes. One approach involves a hardware-type protection system whereby use of the software is allowed only under the condition that a specific device is coupled to a recording/reproduction apparatus to be used for the recording medium. However, this hardware-type protection system becomes costly and is not useful in practice because of requiring the specific device.

SUMMARY OF THE INVENTION

It is therefore an object of the present invention to provide a system of effectively giving protection from the impermissible use of the software.

The present invention provides, for its object, a protection system comprising a recording medium including a first recording area in which data including a program are recorded and also including a second recording area which is formed at a specific position thereof and in which data including a specific identification code are recorded so as not to be rewritable by a user. The protection system further includes control means coupled through a recording/reproduction device to the recording medium for executing the program recorded in the first recording area of the recording medium. The control means is arranged to read out the identification code recorded in the second recording area and stop the execution of the program when the read-out identification code is not coincident with a predetermined ID code.

BRIEF DESCRIPTION OF THE DRAWINGS

The present invention will be described in further detail with reference to the accompanying drawings, in which.

DETAILED DESCRIPTION OF THE INVENTION

Figure 1:
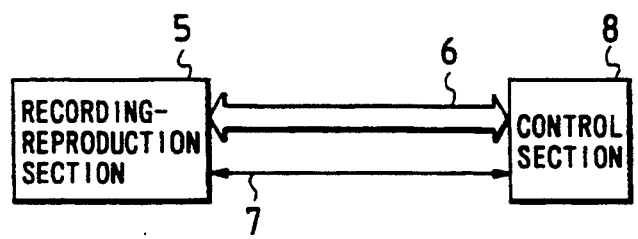
FIG. 1 is a block diagram showing a basic arrangement of an unauthorized use-protection system according to an embodiment of the present invention.
Figure 2:
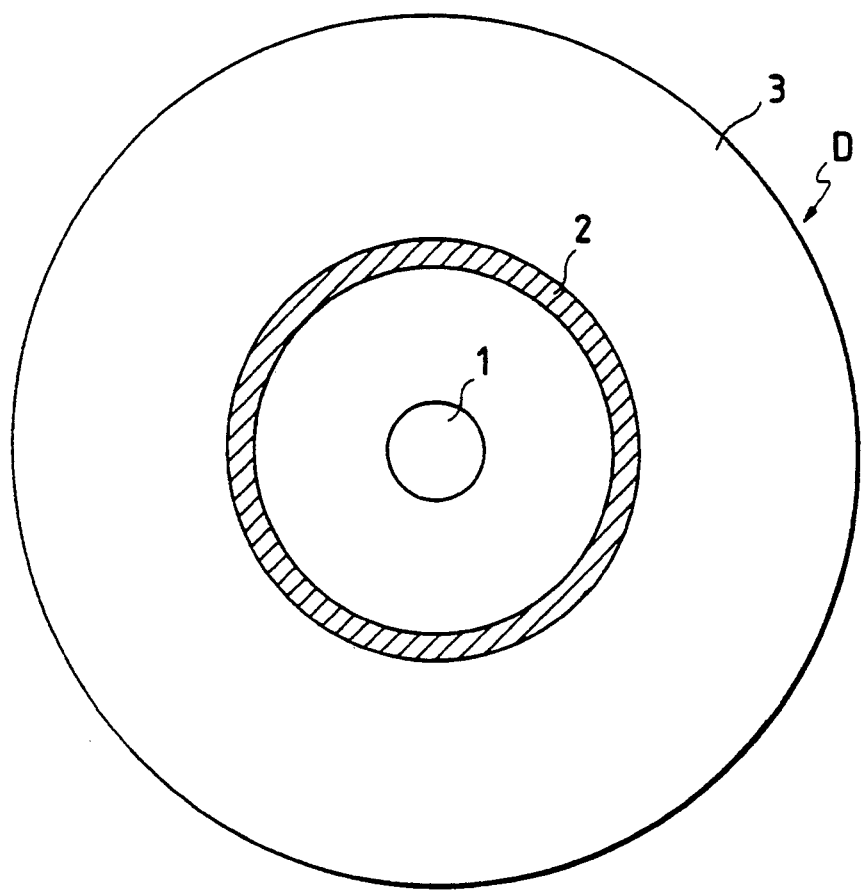
FIG. 2 shows a recording medium to be used in the FIG. 1 protection system.

Referring now to FIG. 1, there is illustrated a basic arrangement of an unauthorized use-protection system according to an embodiment of the present invention. The protection system comprises a recording/reproduction section 5 and a control section 8 which are coupled through a bus 6 and a control signal line 7 to each other. The recording/reproduction section 5 is for recording and reproduction of information on and from a recording medium as illustrated in FIG. 2, and the control section 8 comprises a well known computer. In FIG. 2, the disc-like recording medium designated at character D has a coupling hole 1 to be connected to a rotatable shaft of a disc-driving device, and includes a specific ROM area 2 formed at a predetermined position of the recording medium D. In the predecided ROM area 2, every medium contains an identification code (ID code) with a geometrically embossed configuration for example, successively arranged convex and concaved patterns) so as not to be rewritable by users. Also included in the disc-like recording medium D is a recording/reproduction area 3 comprising general ROM areas in which predetermined data are prestored so as not to be rewritable by the users and further comprising RAM areas each of which allows recording and read-out of data for the users.

Figure 3A:
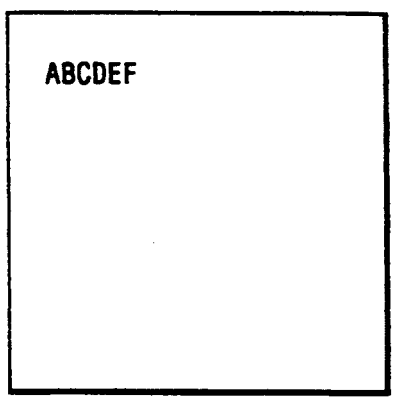
FIGS. 3A and 3B are illustrations of examples of identification codes to be recorded on recording mediums.
Figure 3B:
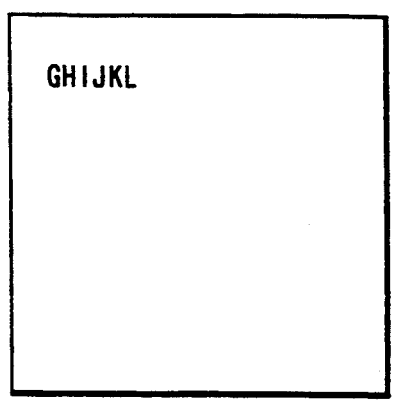

In the recording medium D, the data (including the ID code) prestored in the specific ROM area 2 are arranged to be non-rewritable by the users and have a specific or peculiar content, which is different from that of a different recording medium. For example, when the ID code prestored in the specific ROM area 2 of an original recording medium is "ABCDEF" as illustrated in FIG. 3A, the ID code prestored in the specific ROM area 2 of a recording medium which is used to copy the content recorded in the original recording medium is set to be "GHIJKL" as illustrated in FIG. 3B so as to be different from the ID code "ABCDEF" of the original recording medium.

Figure 4:
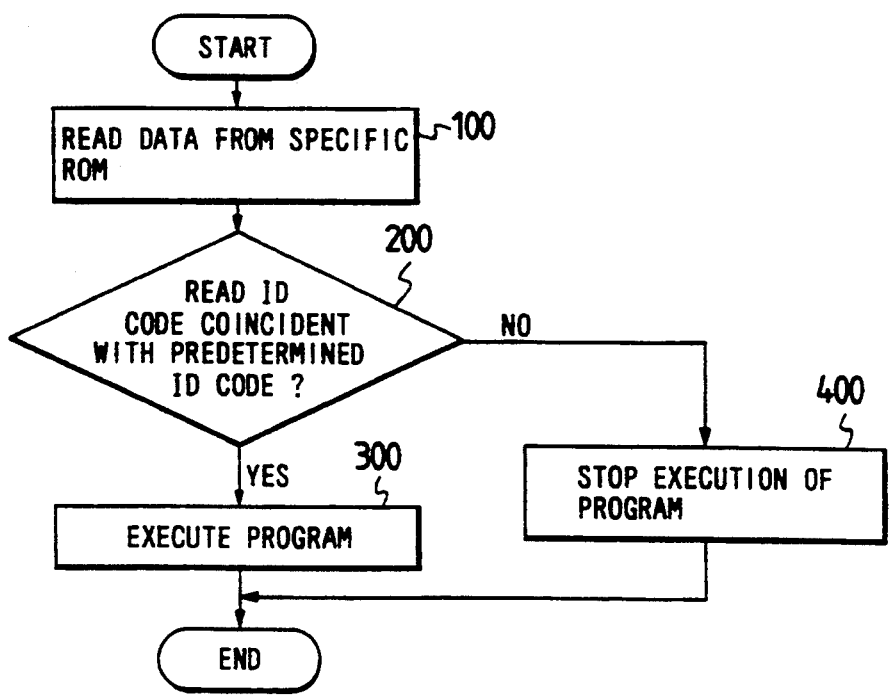
FIG. 4 is a flow chart for describing the protection system of the present embodiment.

Operation of the protection system according to this embodiment will be described with reference to the flow chart illustrated in FIG. 4. In FIG. 4, the operation begins with a step 100 to read the ID code recorded in the specific ROM area of the recording medium, then followed by a step 200 to check whether the read ID code is coincident with an ID code contained in the program, i.e., the ID code of the medium D is compared to an ID code of the program. If the answer is affirmative, the operation advances to a step 300 to executing the program. On the other hand, if negative, the operation goes to a step 400 to stop the execution of the program.

That is, when executing the program by using the data stored in the ROM or RAM regions of the recording/reproduction area 3, the specific data are initially read out from the specific ROM area 2 and the program is executed only under the condition that the read-out ID code agrees with a predetermined ID code, but not executed when the read-out ID code does not agree with the predetermined ID code.

As will be appreciated by one of ordinary skill in the art, the comparison of the ID code from the ROM area with the ID code contained in the program may be carried out under control of a program determining operation of the computer in control section 8 or, alternatively, as an initial segment of the program recorded on the recording medium D. Thus, upon a negative answer to the step 200, in the former instance execution of the program from the medium D is prevented, without having been initiated. However, in the latter instance, program execution will have been initiated to perform the comparison but will be stopped upon a negative answer. The invention is thus properly described as either stopping or preventing execution of the program.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A system for permitting execution of a recorded program only from an authorized recording medium, comprising:

a recording medium including a first recording area in which data including a program are recorded and further including a second recording area at a specific position thereof, said second recording area comprising a geometrically embossed read-only-memory (ROM) area in which data including a specific identification code are geometrically embossed so as not to be rewritable by a user;

said recording medium further including a predetermined identification code recorded thereon; and control means for executing said program recorded in said first recording area of said recording medium, said control means reading out said specific identification code geometrically embossed in said ROM area and said predetermined identification code recorded on said recording medium, said control means stopping the execution of said program when the specific identification code read out from said rom area does not correspond to said predetermined identification (ID) code read out from said recording medium, thereby executing said program only from an authorized recording medium including a specific identification code in said ROM area thereof corresponding to said predetermined identification code recorded thereon.

2. A system for permitting execution of a recorded program only from an authorized recording medium in accordance with claim 1, wherein said predetermined identification code is recorded within said program in said first recording area.

3. A system preventing execution of a recorded program from an unauthorized recording medium, comprising:

a recording medium including: a first recording area in which are recorded data including a program and a predetermined identification code; and a second recording area at a predetermined location thereof, said second recording area comprising a read-only-memory (ROM) area in which non-rewritable data including a specific identification code are permanently written; and control means for executing said program recorded in said first recording area of said recording medium, said control means reading out said specific identification code permanently written in the second recording area and stopping the execution of said program when the specific identification code read out from said second recording area does not correspond to said predetermined identification code recorded in said first recording area of said recording medium, said control means including:

means for comparing said predetermined identification code recorded in said first recording area with said specific identification code permanently written in said ROM area of said recording medium, and means for executing said program recorded in said first recording area only when said means for comparing provides an indication indicative of a correspondence between said specific identification code recorded in said ROM area of said recording medium and said predetermined identification code recorded in said first recording area of said recording medium.

4. A system as recited in claim 3, wherein said control means comprises a computer programmed to execute the steps of:

reading the specific identification code from the ROM area of the recording medium;

comparing the specific identification code read from the ROM area of the recording medium with the predetermined identification code from the first recording area containing the program; and preventing execution of further steps from the program if a result of the comparison is indicative of non correspondence of the specific identification code from the ROM area of the recording medium with the predetermined identification code from the first recording area of said recording medium.

5. An improved system for preventing an unauthorized execution of a program as recited in claim 4, wherein said computer is further programmed to execute further steps from the program if the result of the comparison is indicative of correspondence of the specific identification code from the ROM area of the recording medium with the predetermined identification code from the first recording area of said recording medium.

6. A system for preventing execution of a recorded program from an unauthorized recording medium in accordance with claim 3, wherein said means for executing executes said program recorded in said first recording area only when said means for comparing provides an indication that said specific identification code recorded in said ROM area is substantially identical to said predetermined identification code recorded in said first recording area of said recording medium.

7. A system for preventing execution of a recorded program from an unauthorized recording medium in accordance with claim 6, wherein said predetermined identification code is recorded within said program in said first recording area.

8. A system for preventing execution of a recorded program from an unauthorized recording medium in accordance with claim 7, wherein said specific identification code is geometrically embossed within said ROM area.

9. A system for preventing execution of a recorded program from an unauthorized recording medium in accordance with claim 3, wherein said predetermined identification code is recorded within said program in said first recording area.

10. In a system for preventing an unauthorized execution of a program recorded on a recording medium, including a recording/reproducing means for recording data on and reproducing data from one or more recording media and a control means for determining whether a particular recording medium being read by said recording/reproducing means is authorized for execution of a predetermined program recorded thereon, said recording medium further including a predetermined identification code recorded thereon, the improvement wherein each recording medium comprises a non-rewritable read-on-memory (ROM) area including a specific identification code permanently written therein;

said control means is connected to receive from said recording/reproducing means data read from said ROM area of said particular recording medium being read and said predetermined identification code recorded on said recording medium;

said recording/reproducing means is connected to provide to said control means the specific identification code permanently written in said ROM area of, and said predetermined identification code recorded on, the particular recording medium being read, said control means operating to compare said specific identification code with said predetermined identification code and to prevent execution of the program recorded on said particular recording medium including said non-rewritable ROM area when said specific identification code does not correspond to said predetermined identification code.

11. An improved system for preventing an unauthorized execution of a program as recited in claim 10, wherein said predetermined identification code is recorded in a recording area containing the program recorded on the particular recording medium.

12. An improved system for preventing an unauthorized execution of a program as recited in claims 11, wherein said control means comprises a computer programmed to execute the steps of:

causing said recording/reproducing means to read the specific identification code from the ROM area of the particular recording medium and to read the predetermined identification code from the recording area containing the program;

comparing the specific identification code read from the ROM area of the particular recording medium with the predetermined identification code from the recording area containing the program; and preventing execution of further steps from the program if a result of the comparison is indicative of non correspondence between the specific identification code from the ROM area of the particular recording medium and the predetermined identification code from the recording area containing the program.

13. An improved system for preventing an unauthorized execution of a program as recited in claim 12, wherein said computer is further programmed to execute further steps from the program if the result of the comparison is indicative of correspondence between the specific identification code from the ROM area of the particular recording medium and the predetermined identification code from the recording area containing the program.

14. A system for preventing an unauthorized execution of a program recorded on a recording medium in accordance with claim 10, wherein said control means prevents execution of said program recorded on said particular medium when said specific identification code permanently written in said ROM area of solid particular recording medium is different from said predetermined identification code recorded on said particular recording medium.

15. A system for preventing an unauthorized execution of a program recorded on a recording medium in accordance with claim 14, wherein said predetermined identification code is recorded within said program recorded on said particular recording medium.

16. A system for preventing an unauthorized execution of a program recorded on a recording medium in accordance with claim 15, wherein said specific identification code is geometrically embossed within said ROM area of said particular recording medium.

17. A system for preventing an unauthorized execution of a program recorded on a recording medium in accordance with claim 10, wherein said predetermined identification code is recorded within said program recorded on said particular recording medium.

* * * * *